W. B. MORTON.
METHOD AND APPARATUS FOR FEEDING MOTION PICTURE FILMS.
APPLICATION FILED DEC. 22, 1916.
1,361,167.
Patented Dec. 7, 1920.
2 SHEETS—SHEET 1.
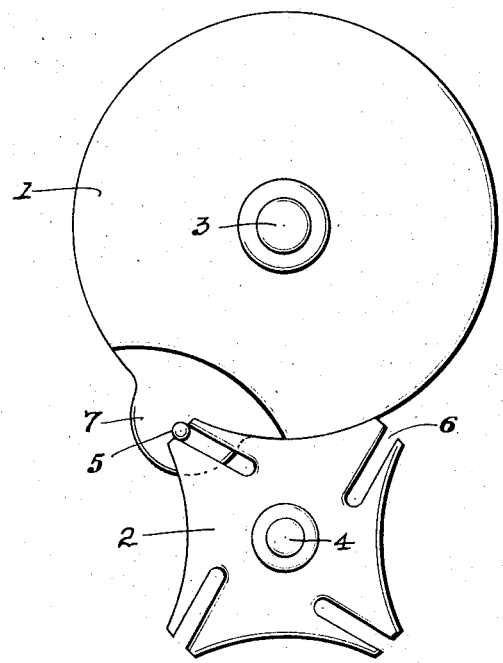
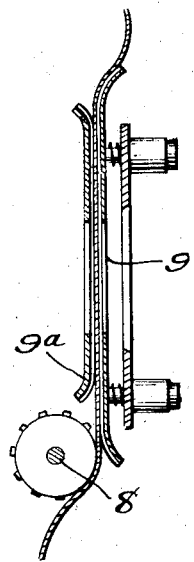
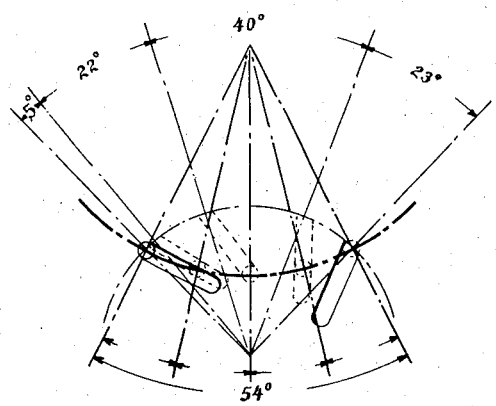
Inventor
W. B. Morton W. B. MORTON.
METHOD AND APPARATUS FOR FEEDING MOTION PICTURE FILMS.
APPLICATION FILED DEC. 22, 1916.
1,361,167.
Patented Dec. 7, 1920.
2 SHEETS—SHEET 2.
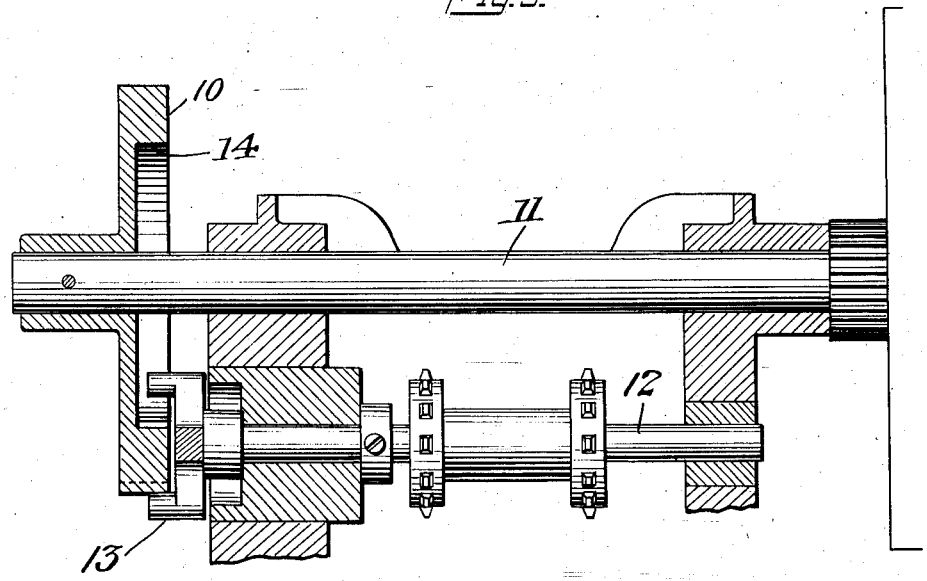
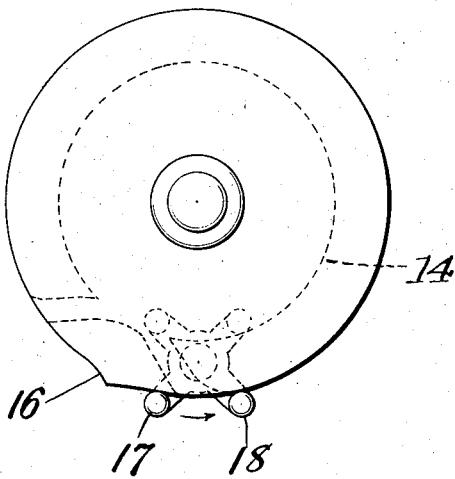
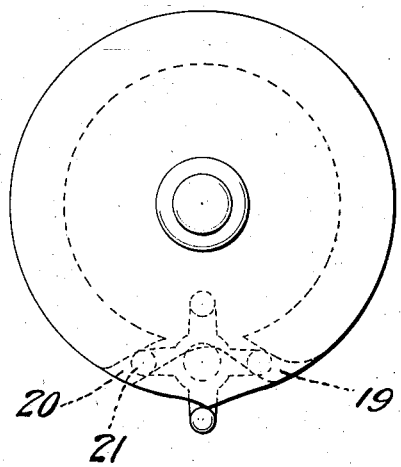
Inventor
W. B. Morton

UNITED STATES PATENT OFFICE.

WOOLRIDGE BROWN MORTON, OF NEW YORK, N. Y., ASSIGNOR TO NICHOLAS POWER COMPANY, INC., OF NEW YORK, N. Y., A CORPORATION OF DELAWARE.

METHOD AND APPARATUS FOR FEEDING MOTION-PICTURE FILMS.

1,361,167. Specification of Letters Patent. Patented Dec. 7, 1920.

Application filed December 22, 1916. Serial No. 138,504.

*To all whom it may concern:*

Be it known that I, WOOLRIDGE BROWN MORTON, a citizen of the United States, and a resident of the city, county, and State of New York, have invented new and useful Improvements in Methods and Apparatus for Feeding Motion-Picture Films, of which the following is a specification.

This invention relates to an improved method of feeding moving picture films and to novel mechanism for carrying such method into effect.

In the operation of moving picture machines as now universally employed in this country, the film carrying the series of pictures to be successively projected upon the screen is fed across the path of the light rays by means of an intermittent movement designed to give a period of rest between the successive movements during which the sprocket is securely and rigidly locked.

It has long been known to be desirable to make the periods of rest as long as possible compared with the periods of movement, but in the majority of the different makes of machines now on the market the ratio of rest to movement is only 3 to 1. Such machines have their intermittent sprockets driven through a Geneva gear in which the movement of the driven member or star wheel is effected during 90 degrees of each complete rotation of the driving member, the driven member being given a quarter turn.

In order to hold the film absolutely stationary during the period of rest, the machine is provided at the projection aperture with a pair of brake shoes, termed tension guides, which exert a constant frictional drag on the film, destroying its momentum and preventing the film over-running the feed sprocket.

During the period of movement, the light is cut off from the screen by a revolving shutter having a wing or blade of sufficient width to completely intercept the light before the movement of the film begins and to keep the light cut off until the film is again brought to rest.

If the shutter shaft and the driving shaft of the Geneva couple be rotated in unison, as is usually the case, the shutter blade which obscures the movement of the film must be equal at least to 90 degrees of the total circumference of the shutter, plus an amount varying with the area of the cross section of the light rays at the point of intersection by the shutter.

It has been found that with a shutter having a single blade, that is, making but one interception of the light at each successively projected picture, there is produced an appearance of irregular illumination on the screen, popularly designated as a flicker. When, however, the light is intercepted with sufficient frequency and all the periods of illumination and darkness are of equal duration, the flicker disappears. It has been also determined by operating the machine without a film and using various shutters of different designs, that a shutter having three blades giving equal periods of illumination and darkness when operated at the normal speed of sixteen revolutions per second, will produce the effect of practically uniform illumination corresponding closely to the steady appearance of a stereopticon slide or still picture.

A shutter of this character is of course impossible with a Geneva gear of the kind most commonly used, and various attempts have been made to cut down the period of movement to permit the use of a shutter blade of this character, but such attempts have not so far proved entirely successful for the reason that the rapid movement of the film through the medium of the driving sprocket wears out and tears the sprocket holes in the margin of the film so that the film is in a short time unfit for use.

The period of usefulness or "life" of the film cannot be too greatly shortened on account of the cost of its production, and so far as I am aware, there has not at this time been produced an intermittent gearing which will move the film with the desired rapidity, without wearing out the film too rapidly for commercial success.

By means of the improved method of feeding the film forming the subject-matter of this application, I am able to effect the movement of the film within a period of less than one fifth the period of rest without placing the film under a materially greater strain than the ordinary 90-degree Geneva movement of the majority of the present-day machines.

In the accompanying drawings, I have illustrated two forms of apparatus for carrying the improved method into effect, one such apparatus consisting of a modification of the well known Geneva gear and the other an intermittent drive of the cam motion type now in use on one make of machine now on the market.

In the said drawings,

Figure 1 shows a side elevation of the modified Geneva couple;

Fig. 2 is a diagrammatic view showing the relative angular velocities of the driving and driven members of the couple during their period of engagement;

Fig. 3 is a vertical sectional view of the cam movement type of gear;

Figs. 4 and 5 are diagrammatic views showing the relative positions of the driving and driven parts of the cam gear; and Fig. 6 is a diagrammatic view showing the relative position of the driving sprocket and film-holding guides of a moving picture machine.

Referring particularly to Figs. 1 and 2 of said drawings, 1 represents the driving member and 2 the driven member. The driving shaft, which is indicated at 3, is to be rotated continuously at a uniform speed and the driven shaft 4 will be rotated intermittently through one quarter of a revolution with intervening periods of rest, as will be later described.

This form of my improved gear may be termed a modified Geneva gear, the driving member consisting, as in an ordinary Geneva gear, of a disk having on one side a projection 7 carrying a driving pin 5 engaging the slots 6 of the driven member 2, which is similar in appearance to the usual star wheel. Between the slots 6, the edges of the star wheel are curved inward on a radius equal to the radius of the driving disk to form a locking engagement between the two parts of the couple when the driven member is at rest.

In the type of gear shown, the disk is of a greater thickness than the star wheel, and at the side having the projection 7, the disk is cut away to a depth equal to the thickness of the star wheel so that the projection and the pin may pass behind the star wheel to bring this pin into the slot 6 to be engaged.

It will be understood that a film feed sprocket may be rigidly attached to the shaft of the star wheel as indicated at 8 in Fig. 6, the sprocket being arranged beneath the aperture 9 against which the film is held with a constant pressure by the spring-backed tension guides 9ª. The pressure of the springs against the film produces a constant braking effect tending to increase the load on the gear during the period of acceleration, but working in opposition to the momentum of the sprocket, thereby assisting the gear during the retarding movement.

In my improved driving gear the slots 6 are not radial to the driven shaft, but are inclined to the radial at an angle determined by the ratio of the diameters of the driving and driven parts. To express it otherwise, the angle of the slot 6 to the radial is determined by the angular value of the portion of the circumference of the driving disk engaged by the concave locking faces of the star wheel, the angle being such that the sides of the slot to be engaged by the driving pin are tangential to the arc of movement of the driving pin. In the example shown, the entire 90 degrees' movement of the star wheel takes place in 54 degrees of movement of the driving disk. By means of this construction the movement of the star wheel begins with a zero velocity and is slowly accelerated through the first part of its movement, the rate of acceleration growing gradually greater until the maximum is reached, which velocity is maintained substantially uniform for a portion of the movement, the movement being then retarded with a more rapid decrease in speed than the rate of acceleration.

As illustrated graphically in Fig. 2, the star wheel moves through only about 5 degrees of its total 90 degrees during the first quarter period of movement of the driving pin wheel; during the second equal period of the driving disk the movement of the star wheel is about 22 degrees. In the third period of movement of the driving disk the star wheel moves through about 40 degrees, while in the final period of movement, during which the velocity is decreased, the star wheel moves through about 23 degrees, when it is brought to rest by the engagement of one of its locking faces with the periphery of the driving disk. During the 40-degree period of movement, the velocity of the star wheel is almost uniform, the increasing distance of the point of engagement of the pin and the slot from the center of the driven shaft being compensated for by the more effective angle of the slot.

I have determined that the overstrain of the film is caused by a too rapid acceleration of the film against the starting friction imposed by the film guides, as much as by an excessive maximum velocity. By my improved gearing, the acceleration at starting is very slow, and the maximum velocity is kept down by providing a long period of substantially uniform maximum velocity between the periods of acceleration and retardation.

With the ordinary Geneva gear, in which the slots in the star wheel are radial to the axis of rotation, the maximum velocity occurs only for the moment that the pin is at the bottom of the slot. Hence, the period of movement at the maximum, or approximately maximum, velocity is so short that the total period of movement to effect the same advance of the film is much longer than required with my improved gear without exceeding the same actual maximum velocity.

By determining the inclination of the slots of the geneva with relation to the momentum of the sprocket and attached parts and the braking effect of the tension guides, the film may be brought to rest at the completion of the movement without jar or tendency to overrun the sprocket in a period of movement quite as brief as illustrated in the drawings, thereby leaving a long period of movement for the accelerating period so that the film will not be strained at any part of its movement.

In Figs. 3, 4 and 5 I have illustrated a modified apparatus for carrying my improved intermittent movement into effect, the movement in this case being of the cam and "pin cross" type employed in the only moving picture machine now on the market which does not employ the ordinary Geneva gear. The cam and pin cross movement of this machine as now on the market is disclosed in U. S. Patent No. 1,129,121, granted Feb. 23, 1915 to Nicholas Power. The cycle of operations imparted to the film feeding sprocket by this movement differs from that of the Geneva gear in that the period of rest is almost five times the duration of the period of movement, the period of movement comprising, as in the case of the geneva, equal periods of acceleration and retardation. The advantage of this movement over the geneva is that the cam is so shaped as to give a uniform acceleration to the film, whereas in the geneva the rate of acceleration varies considerably, imposing greater strain at one period of the movement than at other periods.

My modified gear as disclosed in Figs. 3, 4 and 5 embodies a cam and "pin cross" as in the Power gear, but instead of producing a period of movement with equal periods of acceleration and retardation, the cam is so constructed as to effect a period of movement comprising first a period of uniform acceleration at a comparatively slow rate, a period of movement at uniform velocity at the maximum speed of movement of the film, and a period of retardation at a more rapid rate than the rate of acceleration.

In the drawings, the cam wheel is indicated at 10 and is supported on the end of a continuously driven shaft 11, operated through gearing, not shown, from the power shaft of the machine. A sprocket shaft 12 is supported in suitable bearings in parallelism with the driving shaft of the cam and carries on its end the "pin cross" 13 which comprises, as in the Power gear, a four-arm cross, each arm of which carries an axially projecting pin extending toward the face of the cam wheel. The cam comprises a locking ring or flange 14 of a width to pass between the pins on opposite sides of the axis of rotation of the pin cross and engage all four pins to hold the pin cross locked against rotation during the period of rest. The pin cross is rotated one quarter of a revolution at each rotation of the cam by means of the cam projection and slots formed on one side of the cam.

The shape of the slots and their relation to the cam projection of the preferred design are shown in Figs. 4 and 5. The projection 16 first engages the most advanced pin 17 and commences to rotate the pin cross in the direction of the arrow, the projection being located so that the second outside pin 18 is opposite the first slot 19 in the direction of rotation of the cam, thereby causing the pin 18 to enter the slot.

The slot 19 and the slot 20 through which the first inside pin 21 begins to pass, are not straight and at a uniform angle to the radius of the cam as in the Power gear, but instead the inner portion of the slot 20 and the outer end of the slot 19 are curved so as to produce a uniform acceleration of the pin cross, but at a slower rotation than would be effected by a straight slot. The middle portion of each cam slot is so shaped with relation to the path of movement of the parts as to produce a uniform velocity of the pin cross while the outer part of the slot 20 and the inner part of the slot 19 are so curved as to produce a retardation at a more rapid rate than the acceleration effected by the opposite ends of the slots.

I have found that by so modifying the shape and proportions of the parts, the period of movement of the sprocket wheel may be reduced to only 50 degrees of the 360 degrees of the complete revolution without exceeding the maximum velocity of the sprocket of the Power gear of the above mentioned patent, or the rate of acceleration, although in the patented gear the period of movement of the sprocket occupies more than one sixth of the total period. The strain on the film effected by my improved movement is therefore no greater than with the gear of the patent, but is accomplished in such a small fraction of the total revolution of the driving cam as to enable me to use a shutter having three blades of equal width with intervening spaces of the same width whereby the appearance of "flicker" is entirely avoided, as heretofore explained.

In adapting the cam gear above described to actual practice, the relative lengths of the periods of acceleration and retardation may be determined with relation to the drag on the film produced by the tension guide so as to maintain the film under substantially uniform tension throughout its entire period of movement, thereby maintaining the maximum extent of movement in the shortest possible time for a predetermined strain upon the film. With the cam shown in the drawing, the actual pulling strain on the film, although its movement is accomplished in 50 degrees of the complete rotation of the driving member, is actually less than with the present 4-slot geneva in use on a large number of machines.

I have shown and described my improved gear as a modification of the intermittent gears now in use, but it is to be understood that my invention is not limited to coöperating parts of those particular types but covers all such parts, whatever their configuration, as come within the terms of the appended claims.

I claim:

1. A film feeding mechanism for moving picture machines comprising means for maintaining a constant frictional drag on the film and intermittently acting means for drawing the film forward against said drag comprising a driving and locking couple composed of a driving and driven part each rigid throughout, said parts having coöperating locking faces adapted to maintain the driven part stationary during a portion of each complete rotation of the driving part and greater than 270 degrees, and coöperating driving portions adapted to effect a quarter turn of the driven part during a partial rotation of the driving part of less than 90 degrees, the said partial rotation of the driven part comprising a period of acceleration and a period of retardation, the period of acceleration exceeding in duration the period of retardation during a uniform velocity of movement of the driving part.

2. A film-feeding mechanism for moving picture machines comprising means for maintaining a constant frictional drag on the film, a sprocket for feeding the film through said friction means and an intermittent couple for driving said sprocket one-quarter of a revolution at each operation, said intermittent couple comprising two members each rigid throughout and having coöperating locking faces to maintain the driven part stationary during more than three-quarters of each complete rotation of the driving part, and coöperating driving portions adapted to effect a quarter turn of the driven part during a movement of less angular extent of the driving part, said quarter turn comprising a period of acceleration beginning at zero speed and extending to maximum speed and a period of retardation, the period of retardation being of less duration than the period of acceleration during a uniform velocity of movement of the driving part.

3. A film-feeding mechanism for moving picture machines comprising means for maintaining a constant frictional drag on the film, a sprocket for feeding the film through said friction means and an intermittent couple for driving said sprocket one-quarter of a revolution at each operation, said intermittent couple comprising two members each rigid throughout and having coöperating locking faces to maintain the driven part stationary during more than three-quarters of each complete rotation of the driving part, and coöperating driving portions adapted to effect a quarter turn of the driven part during a movement of less angular extent of the driving part, said quarter turn comprising a period of uniform acceleration beginning at zero speed and extending to maximum speed and a period of uniform retardation from maximum speed to zero speed, the period of retardation being of less duration than the period of acceleration during a uniform velocity of movement of the driving part.

4. A film-feeding mechanism for moving picture machines comprising means for maintaining a constant frictional drag on the film, a sprocket for feeding the film through said friction means and an intermittent couple for driving said sprocket one-quarter of a revolution at each operation, said intermittent couple comprising two members each rigid throughout and having coöperating locking faces to maintain the driven part stationary during more than three-quarters of each complete rotation of the driving part, and coöperating driving portions adapted to effect a quarter turn of the driven part during a movement of less angular extent of the driving part, said quarter turn comprising a period of uniform acceleration beginning at zero speed and extending to maximum speed and a period of uniform retardation, one of said driving portions having a surface over which the driving portion of the other member moves progressively during the period of acceleration and a second surface over which the driving portion of the other member moves during the period of retardation, the two surfaces being of such length and position that the period of retardation is of less duration than the period of acceleration during a uniform velocity of movement of the driving part.

Signed at New York city, in the county of New York and State of New York, this 19th day of December, 1916.

WOOLRIDGE BROWN MORTON,